US011326496B2

(12) United States Patent
Osaki

(10) Patent No.: US 11,326,496 B2
(45) Date of Patent: May 10, 2022

(54) VEHICLE CONTROL DEVICE

(71) Applicant: DENSO CORPORATION, Kariya (JP)

(72) Inventor: Satoru Osaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/847,045

(22) Filed: Apr. 13, 2020

(65) Prior Publication Data
US 2020/0240311 A1    Jul. 30, 2020

Related U.S. Application Data

(63) Continuation of application No. PCT/JP2018/039075, filed on Oct. 19, 2018.

(30) Foreign Application Priority Data

Oct. 24, 2017  (JP) .............................. JP2017-205454

(51) Int. Cl.
| | | |
|---|---|---|
| *F01N 3/00* | (2006.01) | |
| *F01N 3/24* | (2006.01) | |
| *F02M 26/15* | (2016.01) | |
| *F01N 11/00* | (2006.01) | |
| *F02D 41/02* | (2006.01) | |

(52) U.S. Cl.
CPC .............. *F01N 3/24* (2013.01); *F01N 11/00* (2013.01); *F02D 41/0235* (2013.01); *F02M 26/15* (2016.02); *F02D 2200/08* (2013.01)

(58) Field of Classification Search
CPC ........ F01N 3/24; F01N 11/00; F02D 41/0235; F02D 2200/08; F02M 26/15
See application file for complete search history.

(56) References Cited

U.S. PATENT DOCUMENTS

| | | | |
|---|---|---|---|
| 2004/0163381 A1 | 8/2004 | Shirakawa et al. | |
| 2010/0024394 A1* | 2/2010 | Kitazawa | F01N 3/2066 60/276 |

(Continued)

FOREIGN PATENT DOCUMENTS

| | | |
|---|---|---|
| JP | 2000-297704 | 10/2000 |
| JP | 2013-130120 | 7/2013 |
| WO | 2016/017125 | 2/2016 |

OTHER PUBLICATIONS

Regenfuss, "Heavy Duty OBD Program Update", SAE 2015 On-Board Diagnostics Symposium, Sep. 17, 2015, 31 pages.

*Primary Examiner* — Matthew T Largi
(74) *Attorney, Agent, or Firm* — Nixon & Vanderhye P.C.

(57) ABSTRACT

An ECU stores and holds in a memory unit NOx information which is information concerning NOx in an exhaust gas flowing through an exhaust system of an onboard engine of a vehicle or NOx purification by a catalyst placed in the exhaust system. The ECU includes a parameter acquisition unit that acquires an NOx parameter, which is an outflow quantity of NOx flowing out to a downstream side of the catalyst or a correlation value correlating to the outflow quantity of NOx, according to a working state of the engine, an integrated value computation unit that computes a parameter integrated value by integrating NOx parameters acquired by the parameter acquisition unit, and a storage processing unit that stores in the memory unit the parameter integrated value as the NOx information.

15 Claims, 8 Drawing Sheets

(56) References Cited

U.S. PATENT DOCUMENTS

| | | | |
|---|---|---|---|
| 2013/0261930 A1* | 10/2013 | Kurtz | F01N 3/208 |
| | | | 701/102 |
| 2015/0226105 A1* | 8/2015 | Hagiwara | F01N 11/007 |
| | | | 73/114.75 |
| 2016/0131063 A1* | 5/2016 | Kogo | F02D 41/1462 |
| | | | 60/276 |

* cited by examiner

VEHICLE CONTROL DEVICE

CROSS REFERENCE TO RELATED APPLICATION

The present application is a continuation application of International Patent Application No. PCT/JP2018/039075 filed on Oct. 19, 2018, which designated the U.S. and claims the benefit of priority from Japanese Patent Application No. 2017-205454 filed on Oct. 24, 2017. The entire disclosures of all of the above applications are incorporated herein by reference.

TECHNICAL FIELD

The present disclosure relates to a vehicle control device.

BACKGROUND

Conventionally, a known device is employed in a vehicle for computing a quantity of NOx discharged from an onboard engine and for implementing engine control or exhaust purification control.

SUMMARY

According to an aspect of the present disclosure, a vehicle control device is configured to store and hold, in a memory unit, NOx information which is information concerning NOx in an exhaust gas flowing through an exhaust system of an onboard engine of a vehicle or concerning NOx purification by a catalyst placed in the exhaust system.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
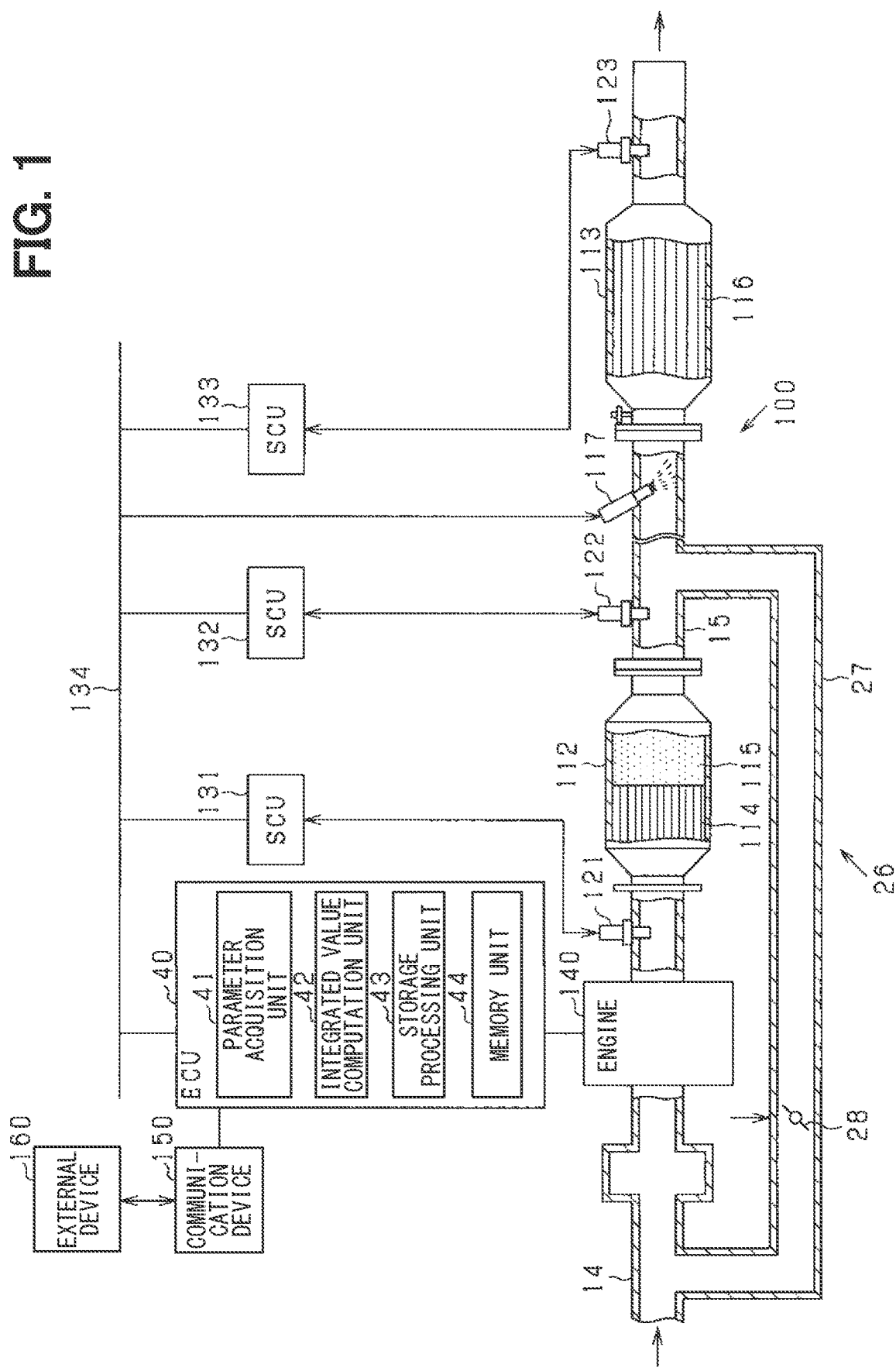
FIG. 1 is a block diagram showing an exhaust purification system.

Hereinafter, examples of the present disclosure will be described.

According to an example of the disclosure, a vehicle control device is for computing a quantity of NOx discharged from an onboard engine and for implementing engine control or exhaust purification control on the basis of the quantity of NOx. According to an example, the vehicle control device implements processing of controlling an introduction quantity of an EGR gas, which is an engine recirculation gas, or controlling a feed quantity of a reducing agent against an NOx purification catalyst on the basis of, for example, the quantity of NOx.

When a vehicle is being driven, a quantity of NOx discharged from an engine or a state of NOx purification generally changes from time to time. Therefore, the vehicle control device may be configured to implement a control for inhibiting NOx discharge to the greatest possible extent while coping with the change appropriately.

In recent years, it is considered that objective assessment whether satisfactory purification performance is exerted under various working conditions is required in the market.

According to one aspect of the present disclosure, a vehicle control device is configured to store and hold, in a memory unit, NOx information which is information concerning NOx in an exhaust gas flowing through an exhaust system of an onboard engine of a vehicle or concerning NOx purification by a catalyst placed in the exhaust system. The vehicle control device comprises a parameter acquisition unit configured to acquire an NOx parameter, which is an outflow quantity of NOx flowing out to a downstream of the catalyst or a correlation value correlating to the outflow quantity of NOx, according to a working state of the engine. The vehicle control device further comprises an integrated value computation unit configured to integrate NOx parameters acquired by the parameter acquisition unit to compute a parameter integrated value. The vehicle control device further comprises a storage processing unit configured to store, in the memory unit, the parameter integrated value as the NOx information.

This configuration may enable to acquire the parameter integrated value computed by integrating NOx parameters acquired according to the working state of the engine. Therefore, the configuration may enable to readily grasp how purification performance varies among various working conditions. In addition, the configuration may enable to readily assess performance dependent on the working state.

In addition, the configuration may enable to accurately grasp performance concerning NOx discharge or NOx purification in a vehicle.

First Embodiment

Referring to the drawings, embodiments will be described below. A first embodiment embodies a vehicle control device that acquires information concerning an NOx sensor in a system that uses the NOx sensor to detect an NOx concentration in an exhaust which is discharged from an onboard diesel engine and regarded as a gas to be detected. Hereinafter, in the drawings, the same signs will be assigned to parts of the embodiments which are identical to or consistent with one another. The explanations on the parts denoted by the same signs will be invoked.

As shown in FIG. 1, the present embodiment is concerned with an engine 10 that is an onboard multi-cylinder diesel engine which is a compression ignition type internal combustion engine and an exhaust purification system 100 to be described later. In the present embodiment, an electronic control unit (hereinafter, ECU 40) serving as a vehicle control device plays a pivotal role in implementing various controls of the engine 10. In the present embodiment, the ECU 40 is equivalent to the vehicle control device.

The engine 10 is, for example, an in-line four-cylinder diesel engine, and has four cylinders formed in a cylinder block. A piston is stored in the cylinder so that the piston can make a reciprocating motion. A cylinder head is mounted to the cylinder block. The cylinders, the pistons, and the cylinder head form a combustion chamber.

An intake pipe 14 and an exhaust pipe 15 are coupled to the cylinder block. The intake pipe 14 is connected to the cylinders via an intake manifold. The exhaust pipe 15 is connected to the cylinders via an exhaust manifold.

An intake valve is fitted in an intake port of the engine 10, and an exhaust valve is fitted in an exhaust port. Air is introduced into the combustion chamber along with an opening action of the intake valve, and a burnt exhaust is discharged from the combustion chamber to the exhaust pipe 15 along with an opening action of the exhaust valve.

The cylinder head is mounted with electromagnetically driven fuel injection valves, through which light oil that is a fuel is directly jetted to the respective cylinders, placed in association with the cylinders. The fuel injection valves are connected to a common rail, which serves as a pressure accumulator, and a fuel tank over a fuel line. A fuel pooled in the fuel tank has a pressure raised by a high pressure pump, and is then sent to the common rail with the pressure. After being held in the common rail in a high pressure state, the fuel is jetted through the fuel injection valves. The fuel injection valve has a pressure sensor that sequentially detects for the associated cylinder a fuel pressure in a fuel passage which extends from the common rail to the injection hole of the fuel injection valve. The fuel tank is provided with a fuel level sensor that detects the level of a fuel in the tank.

The engine 10 is provided with an EGR system 26 that refluxes part of an exhaust as an EGR gas through an intake passage. The EGR system 26 includes an EGR pipe 27 that links the intake pipe 14 and the exhaust pipe 15, and an electromagnetically driven EGR valve 28 that adjusts a reflux quantity (introduction quantity) of an exhaust (EGR gas) flowing through the EGR pipe 27. The EGR pipe 27 is coupled to the exhaust pipe 15 on an upstream side of a urea water addition valve 117 between an oxidation catalytic converter 112 and an SCR catalytic converter 113 which will be described later. When the EGR gas is refluxed, a quantity of NOx discharged from the engine 10 can be reduced.

Further, the engine 10 is provided with a cylinder internal pressure sensor that detects a pressure in the cylinder, a fuel density sensor that detects a density of a fuel to be fed to the fuel injection valve, an intra-cylinder temperature sensor that detects the temperature in the cylinder, an intake pressure sensor that detects the pressure in the intake pipe 14, and an intake temperature sensor that detects the temperature in the intake pipe 14. In addition, the system includes a cooling water temperature sensor that detects the temperature of cooling water, and a crank angle sensor that outputs a crank angle signal at each predetermined crank angle of the engine 10. The system further includes sensors that detect a vehicle speed, an acceleration, and an ambient temperature respectively.

The ECU 40 is a microcomputer including a CPU, a ROM, a RAM, a memory unit 44 serving as a memory, and an input/output interface. The ECU 40 inputs detection signals from the above described various sensors, the crank angle sensor, the cooling water sensor, and an acceleration stroke sensor, and controls driving of various actuators on the basis of the inputted detection signals. As for fuel injection control, an injection mode and an injection quantity of a fuel are adapted to a working state of the engine 10 so that the burn state of the fuel can be optimized on the assumption that a reference fuel is fed to the cylinders. Based on the detection values of the various sensors, the ECU 40 drives the fuel injection valves so that the fuel injection control will become adapted predetermined control. The ECU 40 determines a required controlled variable for an EGR gas, which is required, on the basis of the detection values of the various sensors, and performs a control of adjusting a reflux quantity of the EGR gas according to the required controlled variable.

As shown in FIG. 1, the exhaust purification system 100 that purifies an exhaust is located on an exhaust side of the engine 10. As a constituent element of the exhaust purification system 100, the exhaust pipe 15 forming an exhaust passage is connected to the engine 10. In the exhaust pipe 15, the oxidation catalytic converter 112 and the selective reduction catalytic converter (hereinafter, SCR catalytic converter) 113 are placed orderly from the side of the engine 10. The oxidation catalytic converter 112 includes a diesel oxidation catalyst (DOC) 114 and DPF (Diesel Particulate Filter) 115. The SCR catalytic converter 113 includes an SCR catalyst 116 as a selective reduction type catalyst. The exhaust pipe 15 further includes the urea water addition valve 117, through which urea water (urea water solution) serving as a reducing agent is fed into or added to the exhaust pipe 15, between the oxidation catalytic converter 112 and the SCR catalytic converter 113.

The diesel oxidation catalyst 114 of the oxidation catalytic converter 112 is made up mainly of a ceramic carrier, an oxide mixture containing such components as aluminum oxide, cerium dioxide, and zirconium dioxide, and a noble metal catalyst such as platinum, palladium, or rhodium. The diesel oxidation catalyst 114 oxidizes and purifies hydrocarbon and carbon monoxide contained in an exhaust. The diesel oxidation catalyst 114 raises an exhaust temperature with heat dissipated during catalytic reaction.

The DPF 115 is formed with a honeycomb structure, and structured with a porous ceramic bearing a platinum group catalyst such as platinum or palladium. The DPF 115 captures a particulate substance contained in an exhaust by accumulating the particulate substance on a partition of the honeycomb structure. The accumulated particulate substance is oxidized and purified through combustion. For the combustion, a temperature rise of the diesel oxidation catalyst 114 or a combustion temperature fall of the particulate substance caused by an additive is utilized.

The SCR catalytic converter 113 reduces NOx into nitrogen and water while serving as a post-processor of the oxidation catalytic converter 112. As the SCR catalyst 116, a catalyst formed with a substrate which is made of, for example, zeolite or alumina and bears a noble metal such as Pt on the surface is adopted. When the temperature of the SCR catalyst 116 falls within an activation temperature domain, the SCR catalyst reduces and purifies NOx along with addition of urea serving as a reducing agent.

Limiting current type NOx sensors 121, 122, and 123 are placed as gas sensors on an upstream side of the oxidation catalytic converter 112, on an upstream side of the urea water addition valve 117 between the oxidation catalytic converter 112 and SCR catalytic converter 113, and on a downstream side of the SCR catalytic converter 113, respectively. The NOx sensors 121 to 123 detect an NOx concentration in an exhaust at respective detecting positions. The positions of the NOx sensors in an engine exhaust system and the number of NOx sensors may be arbitrarily determined.

SCUs (Sensor Control Units) 131, 132, and 133 are connected to the NOx sensors 121 to 123 respectively. The detection signals of the NOx sensors 121 to 123 are properly outputted to the SCUs 131 to 133 sensor by sensor. The SCUs 131 to 133 are electronic control units each including a microcomputer having a CPU and various memories, and peripheral circuits. Based on the detection signals of the NOx sensors 121 to 123, the SCUs compute an oxygen (O2) concentration in an exhaust or an NOx concentration serving as a concentration of a specific gas component.

The SCUs 131 to 133 are connected on a communication line 134 such as a CAN bus, and connected to various ECUs (for example, ECU 40) over the communication line 134. In other words, the SCUs 131 to 133 and the ECU 40 are enabled to mutually transfer information over the communication line 134. The SCRs 131 to 133 transmit to the ECU 40, for example, information on an oxygen concentration or an NOx concentration in an exhaust.

The ECU 40 implements control of urea water addition, which is performed through the urea water addition valve 117, on the basis of the NOx concentration detected by each of the NOx sensors 121 to 123. The control of urea water addition will be briefed below. The ECU 40 computes an addition quantity of urea water on the basis of the NOx concentration detected by the NOx sensors 121 and 122 on an upstream side of the SCR catalytic converter 113. In addition, the ECU 40 has the addition quantity of urea water fed back, and corrects the addition quantity of urea water so that the NOx concentration detected by the NOx sensor 123 on a downstream side of the SCR catalytic converter 113 becomes as small as possible. The ECU 40 then controls driving of the urea water addition valve 117 on the basis of the addition quantity of urea water.

When a vehicle is being driven, a quantity of NOx discharged from the engine 10 or a state of NOx purification changes from time to time. Control for inhibiting NOx discharge to the greatest possible extent while coping with the change is appropriately implemented. The ECU 40 has various features, which will be described below, for the purpose of storing and holding NOx information to be used to objectively assess whether satisfactory purification performance is exerted under various working conditions.

The ECU 40 has features serving as a parameter acquisition unit 41, an integrated value computation unit 42, and a storage processing unit 43. These features may be embodied by executing programs stored in the memory unit 44 (storage memory) included in the ECU 40. The various features may be embodied by electronic circuits that are hardware, or may be embodied with processing at least part of which is executed by software, that is, in the computer.

The ECU 40 serving as the parameter acquisition unit 41 acquires (inputs) an NOx concentration detected by the NOx sensor 123 according to a working state of the engine 10, and computes and obtains an outflow quantity of NOx as an NOx parameter, which represents a quantity of NOx flowing out to the downstream side of the SCR catalytic converter 113, on the basis of the acquired NOx concentration.

The ECU 40 serving as the integrated value computation unit 42 computes a parameter integrated value by integrating acquired outflow quantities of NOx.

When any of the working state of the engine 10, the driven state of the vehicle, and the NOx purification state of the catalyst (SCR catalyst 116, the same applies to below) is a specific state, the outflow quantity of NOx may tentatively not take on a normal value. The specific state encompasses, for example, a stop state of the engine 10 and a fuel cut state. In these states, the outflow quantity of NOx is always null.

The specific state further encompasses a state that a predetermined period of time or less has passed since the engine 10 was cold-started, a state that the temperature of the diesel oxidation catalyst 114 or SCR catalyst 116 is equal to or lower than a predetermined value, and a state that the voltage of a battery is lower than a predetermined value. In these states, the ECR system 26 and the urea water addition valve 117 cannot be normally activated, and there is therefore a high possibility that the outflow quantity of NOx may take on an abnormal value.

The specific state further encompasses a state that degradation in purification performance is permitted for the purpose of protecting components. More particularly, degradation in purification performance is permitted in a state that the number of rotations (rotational speed) of the engine 10 falls outside a predetermined range, a state that a vehicle speed falls outside a predetermined range, a state that an atmospheric pressure falls outside a predetermined range, a state that the temperature of cooling water falls outside a predetermined range, and a state that an ambient temperature falls outside a predetermined range. Even in these states, there is a possibility that the outflow quantity of NOx may take on an abnormal value.

The specific state further encompasses a state that the purification system (EGR system 26, oxidation catalytic converter 112, and SCR catalytic converter 113) or a sensor has failed. In this state, there is a possibility that the outflow quantity of NOx may take on an abnormal value.

When quantities of NOx acquired in any of the foregoing specific states are integrated into a parameter integrated value, performance cannot be properly grasped. In the present embodiment, a condition for implementation under which integration is implemented by the integrated value computation unit 42 is defined according to at least any of the working state of the engine 10, the driven state of the vehicle, and the NOx purification state of the catalyst. In the present embodiment, a normally used state that is a state in which at least any of the engine 10, the vehicle, and the catalyst is normally used is predefined. When the normally used state is recognized, the condition for implementation is supposed to be established. In other words, the condition for implementation is defined so that integration is carried out when none of the above described specific states is recognized. The kinds of specific states or the number of specific states may be arbitrarily altered.

The ECU 40 serving as the integrated value computation unit 42 computes a parameter integrated value by integrating the outflow quantities of NOx (NOx parameters) which are acquired on condition that the condition for implementation is established.

For facilitating grasp or assessment of performance, a parameter integrated value is desirably acquired in relation to each of domains defined according to at least any of the working state of the engine 10, the driven state of the vehicle, and the NOx purification state of the catalyst.

In the present embodiment, the ECU 40 serving as the integrated value computation unit 42 therefore computes the parameter integrated value in relation to each of a plurality of domains defined according to at least any of the working state of the engine 10, the driven state of the vehicle, and the NOx purification state of the catalyst.

More particularly, when an outflow quantity of NOx is acquired as an NOx parameter, a state parameter concerning the working state of the engine 10, the driven state of the vehicle, or the NOx purification state of the catalyst is also acquired. The state parameter encompasses, for example, a water temperature, an oil temperature, an ambient temperature, an intake air temperature, a load of the engine 10, an intake pipe pressure, the number of rotations (rotational speed) of the engine 10, an estimated torque of the engine 10, an air-fuel ratio, a vehicle speed, an acceleration, an acceleration stroke, a throttle angle, an EGR upstream pressure, an EGR temperature, an exhaust temperature, and the temperature of the catalyst. The state parameter may include one kind of parameter or two kinds of parameters.

When the condition for implementation is established, the ECU 40 computes a parameter integrated value in relation to each of domains defined according to state parameters.

A description will be made on the assumption that: for example, the number of rotations of the engine 10 and the ambient temperature are designated as state parameters; and a first domain signifying a small number of rotations and a low temperature, a second domain signifying the small number of rotations and a high temperature, a third domain signifying a large number of rotations and the low temperature, and a fourth domain signifying the large number of rotations and the high temperature are defined. In this case, when the condition for implementation is established, the ECU 40 acquires the number of rotations of the engine 10 and the ambient temperature (state parameters) together with an outflow quantity of NOx. Based on the acquired number of rotations of the engine 10 and the acquired ambient temperature (state parameters), the ECU 40 identifies to whichever of the first to fourth domains the acquired outflow quantity of NOx relates (is classified). The ECU 40 then computes a parameter integrated value by integrating outflow quantities of NOx in relation to each of the first to fourth domains.

The ECU 40 serving as the storage processing unit 43 stores the computed parameter integrated value in the memory unit 44. At this time, the ECU 40 stores and holds the parameter integrated value in relation to each of the domains. Preferably, the memory unit 44 is embodied by a nonvolatile memory such as a backup RAM or an EEPROM (registered trademark) so that the parameter integrated value can be stored and held even after an ignition switch is turned off.

Figure 2:
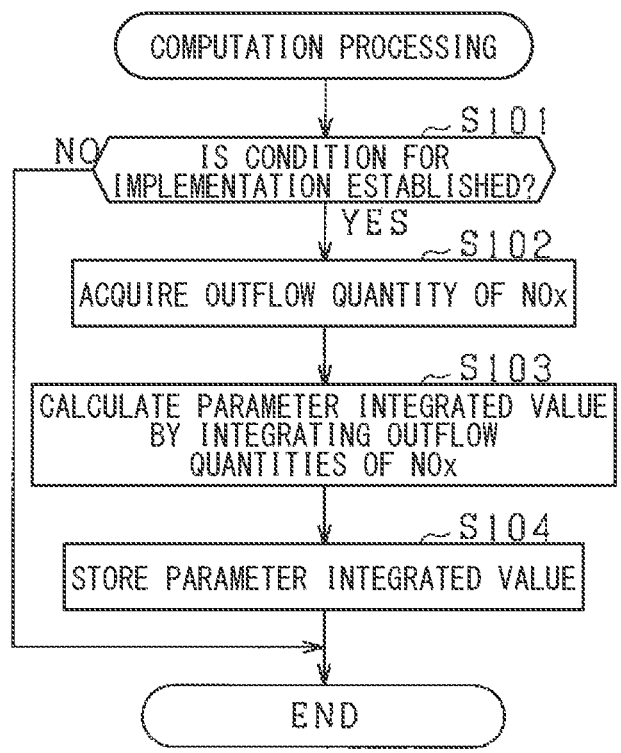
FIG. 2 is a flowchart presenting computation processing.

Referring to FIG. 2, a flow of computation processing to be executed at the time of computing a parameter integrated value will be described below. The computation processing is executed by the ECU 40 at intervals of a predetermined cycle.

The ECU 40 determines whether the above described condition for implementation is established (step S101). When the condition for implementation is not established, the computation processing is terminated. On one hand, when the condition for implementation is established, the ECU proceeds to step S102.

The ECU 40 acquires an outflow quantity of NOx in the above described manner (step S102). At this time, the ECU 40 acquires, as previously described, the outflow quantity of NOx together with state parameters, and then proceeds to step S103.

The ECU 40 computes a parameter integrated value by integrating outflow quantities of NOx (step S103). At this time, the ECU 40 computes the parameter integrated value in relation to each of a plurality of domains defined according to any of the working state of the engine 10, the driven state of the vehicle, and the NOx purification state of the catalyst. In other words, to whichever of the domains an outflow quantity of NOx relates is identified based on the state parameters acquired together with the outflow quantity of NOx. Outflow quantities of NOx are integrated in relation to the identified domain, and thereby a parameter integrated value relative to each domain is computed.

The ECU 40 then stores the computed parameter integrated value in the memory unit 44 (step S104). At this time, the parameter integrated value is stored in association with each of the domains.

As shown in FIG. 1, the ECU 40 includes communication device 150 serving as a communication unit, and configured to be connected to external device 160 located outside a vehicle via the communication device 150. The ECU 40 is configured to output the parameter integrated value, which is stored in the memory unit 44, to the external device 160 via the communication device 150 in response to a request sent from the external device 160.

According to the foregoing embodiment, effects to be described below are obtained.

The ECU 40 computes a parameter integrated value by integrating acquired outflow quantities of NOx (NOx parameters), and stores the computed parameter integrated value in the memory unit 44. The configuration enables to output the computed parameter integrated value to the external device 160 via the communication device 150. Accordingly, the configuration enables to obtain a parameter integrated value computed by integrating outflow quantities of NOx according to the working state of the engine 10. How purification performance varies among various working conditions can be readily grasped. In addition, performance dependent on the working state can be readily assessed.

When outflow quantities of NOx (NOx parameters) acquired when at least any of the working state of the engine 10, the driven state of the vehicle, and the NOx purification state of the catalyst are specific states are integrated, a parameter integrated value needed to properly grasp or assess performance cannot be obtained. Outflow quantities of NOx acquired on condition that the condition for implementation is established are therefore integrated. Accordingly, outflow quantities of NOx can be integrated by excluding outflow quantities of NOx obtained when at least any of the working state of the engine 10, the driven state of the vehicle, and the NOx purification state of the catalyst are specific states. Therefore, a parameter integrated value can be used to properly grasp or assess performance.

The condition for implementation is established in a normally used state that is a state in which at least any of the engine 10, the vehicle, and the catalyst is normally used. Therefore, a parameter integrated value in the normally used state can be acquired in order to grasp or assess performance in the normally used state.

The ECU 40 computes a parameter integrated value in relation to each of a plurality of domains defined according to at least any of the working state of the engine 10, the driven state of the vehicle, and the NOx purification state of the catalyst. Therefore, a parameter integrated value relative to each domain can be obtained. How performance varies depending on a domain can be investigated.

Second Embodiment

Figure 3:
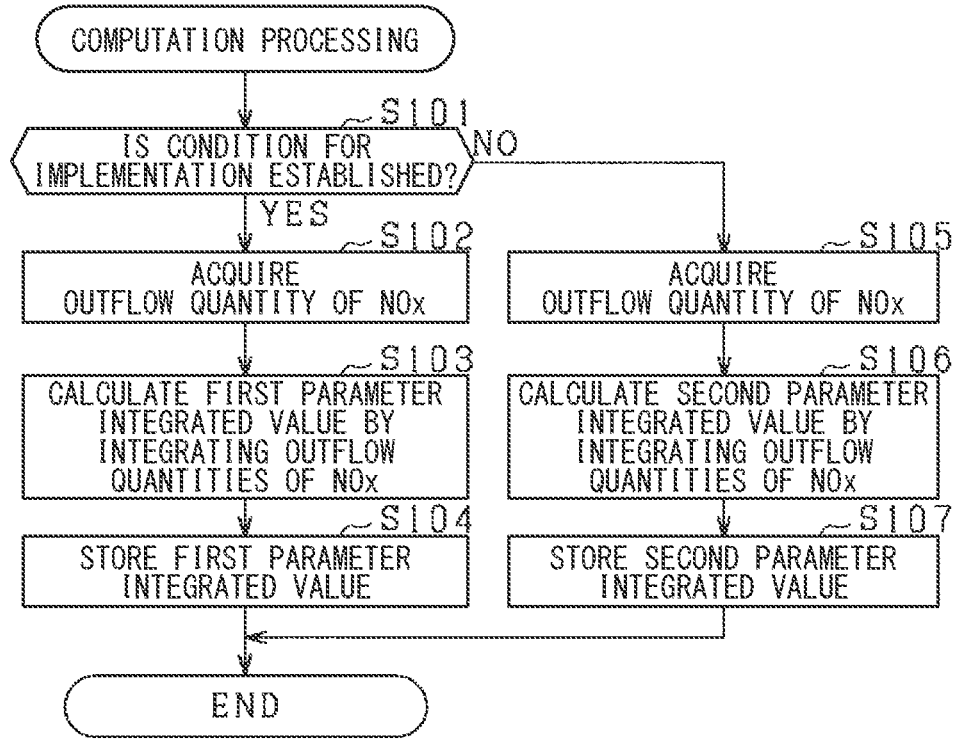
FIG. 3 is a flowchart presenting computation processing of a second embodiment.

The vehicle control device is not limited to the above described embodiment but may be embodied, for example, as described below. Hereinafter, the same signs are assigned to parts of embodiments which are identical to or consistent with one another, and explanations on the parts bearing the same signs will be invoked. In a second embodiment, the ECU 40 has the same constituent elements (features) as the first embodiment does. In addition, even when the condition for implementation is not established, the ECU 40 computes and stores a parameter integrated value. Referring to FIG. 3, computation processing in the second embodiment will be described below.

As shown in FIG. 3, when the condition for implementation is not established (NO at step S101), the ECU 40 acquires an outflow quantity of NOx (step S105). The ECU 40 computes a second parameter integrated value by integrating acquired outflow quantities of NOx (step S106). Thereafter, the ECU 40 stores the computed second parameter integrated value in the memory unit 44 (step S107). The ECU then terminates computation processing of the second embodiment. In the second embodiment, a parameter integrated value computed at step S103 and stored at step S104 is equivalent to a first parameter integrated value.

In the second embodiment, the ECU 40 therefore includes a first computation block that executes step S103 and thus computes a first parameter integrated value by integrating NOx parameters which are acquired on condition that the condition for implementation is established. The ECU 40 further includes a second computation block that executes step S106 and thus computes a second parameter integrated value by integrating NOx parameters which are acquired on condition that the condition for implementation is not established. By executing steps S104 and S107, the ECU 40 stores the first and second parameter integrated values in the memory unit 44.

According to the foregoing embodiment, excellent advantageous effects to be described below are obtained.

The ECU 40 integrates outflow quantities of NOx (NOx parameters), which are acquired on condition that the condition for implementation is not established, thus computes a second parameter integrated value, and stores and holds the second parameter integrated value. Accordingly, NOx information can be grasped even on condition that the condition for implementation is not established.

Third Embodiment

Figure 4:
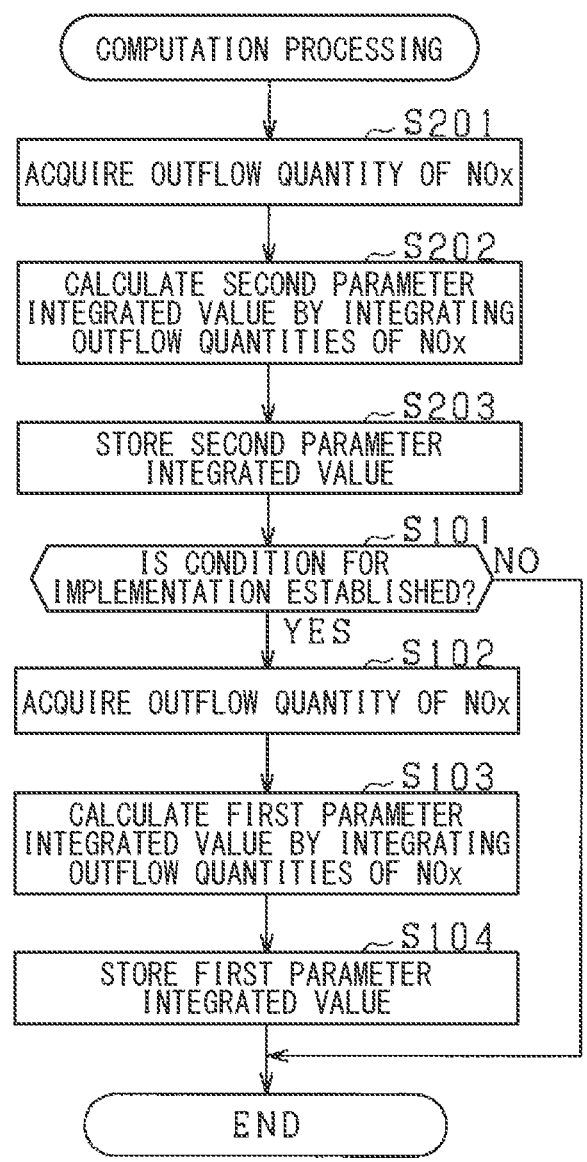
FIG. 4 is a flowchart presenting computation processing of a third embodiment.

The vehicle control device is not limited to the above described embodiments, but may be embodied, for example, as described below. The ECU 40 of a third embodiment includes the same constituent elements (features) as the first embodiment does. In addition, the ECU computes and stores a parameter integrated value irrespective of whether the condition for implementation is established. Referring to FIG. 4, computation processing in the third embodiment will be described below.

As shown in FIG. 4, the ECU 40 acquires an outflow quantity of NOx irrespective of whether the condition for implementation is established (step S201). The ECU 40 computes a second parameter integrated value by integrating acquired outflow quantities of NOx (step S202). Thereafter, the ECU 40 stores the computed second parameter integrated value in the memory unit 44 (step S203). After executing steps S101 to S104, computation processing of the third embodiment is terminated. In the third embodiment, a parameter integrated value stored at step S104 is equivalent to a first parameter integrated value.

In the third embodiment, the ECU 40 therefore includes a first computation block that executes step S103 and thus computes a first parameter integrated value by integrating NOx parameters which are acquired on condition that the condition for implementation is established. The ECU 40 further includes a second computation block that executes step S202 and thus computes a second parameter integrated value by integrating NOx parameters which are acquired irrespective of whether the condition for implementation is established. By executing steps S204 and S104, the ECU 40 stores the first and second parameter integrated values in the memory unit 44.

According to the foregoing embodiment, excellent advantageous effects to be described below are obtained.

The ECU 40 computes a second parameter integrated value by integrating acquired outflow quantities of NOx irrespective of whether the condition for implementation is established. In other words, the second parameter integrated value computed by integrating outflow quantities of NOx acquired over all periods can be acquired. Therefore, NOx information relative to the all periods can be grasped. In addition, a parameter integrated value to be obtained by integrating outflow quantities of NOx, which are acquired on condition that the condition for implementation is not established, can be computed based on the second and first parameter integrated values. Therefore, NOx information can be grasped even on condition that the condition for implementation is not established.

Fourth Embodiment

Figure 5:
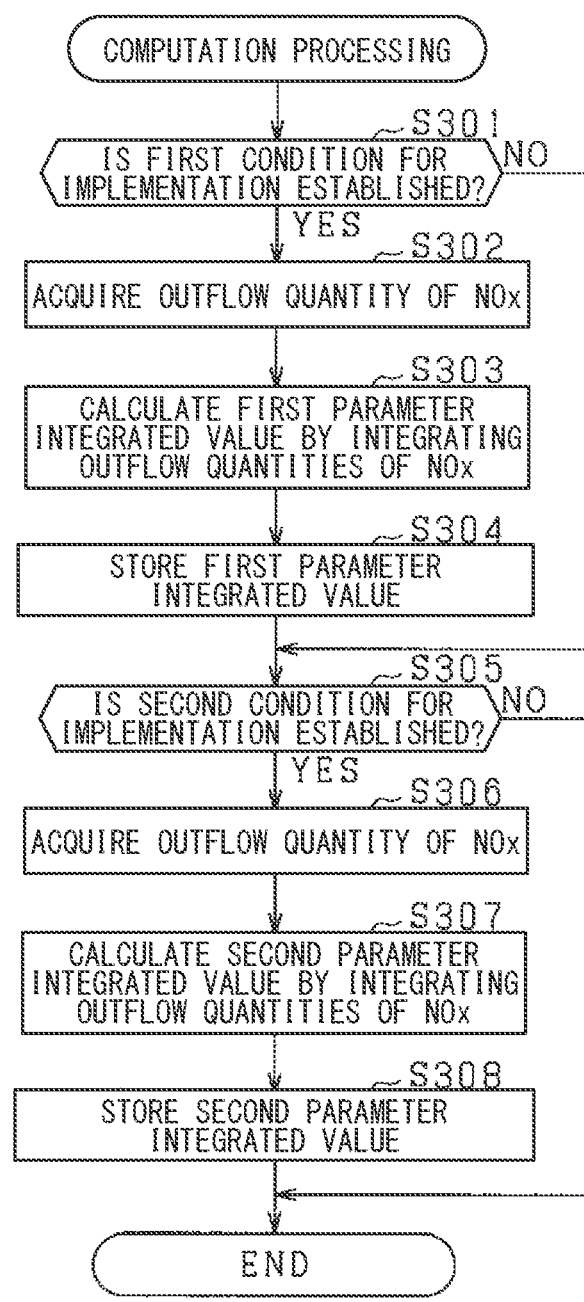
FIG. 5 is a flowchart presenting computation processing of a fourth embodiment.

The vehicle control device is not limited to the above described embodiments, but may be embodied, for example, as described below. In a fourth embodiment, a plurality of conditions for implementation are defined, and the ECU 40 computes and stores a parameter integrated value under each of the conditions for implementation. Referring to FIG. 5, computation processing in the fourth embodiment will be described below.

As shown in FIG. 5, whether a first condition for implementation is established is determined (step S301). The first condition for implementation is identical to the condition for implementation in the first embodiment. For example, the first condition for implementation is determined to be established when a normally used state is recognized. When a result of the determination is in the affirmative, the ECU 40 executes steps S302 to S304. The contents of processing of steps S302 to S304 are identical to those of steps S102 to S104 in the first embodiment. In the fourth embodiment, a parameter integrated value computed at step S303 and stored at step S304 is equivalent to a first parameter integrated value.

On one hand, when the processing of step S304 is terminated or when the first condition for implementation is not established (NO at step S301), the ECU 40 determines whether a second condition for implementation is established (step S305). The second condition for implementation may be arbitrarily designated as long as the second condition for implementation is different from the first condition for implementation. For example, the second condition for implementation may be established when a predetermined time or less has passed since the engine 10 was cold-started, the temperature of the diesel oxidation catalyst 114 or SCR catalyst 116 is equal to or smaller than a predetermined value, or the voltage of a battery is lower than a predetermined value. Further, for example, when the engine 10 is rotating, the second condition for implementation may be established.

When a result of the determination is in the affirmative, the ECU 40 executes steps S306 to S308. The contents of processing of steps S306 to S308 are identical to the contents of processing of steps S102 to S104 in the first embodiment. In the fourth embodiment, a parameter integrated value computed at step S307 and stored at step S308 is equivalent to a second parameter integrated value. In the fourth embodiment, two conditions for implementations, that is, the first and second conditions for implementation are defined. The number of conditions for implementation and the contents of the conditions may be arbitrarily altered.

When the processing of step S308 is terminated or the second condition for implementation is not established (NO at step S305), the ECU 40 terminates computation processing of the fourth embodiment.

According to the foregoing embodiment, excellent advantageous effects to be described below are obtained.

A plurality of conditions for implementation which are different from one another in terms of contents are defined. The ECU 40 computes parameter integrated values by integrating outflow quantities of NOx (NOx parameters) which are acquired under each of the conditions for implementation. Accordingly, integrated values of NOx parameters acquired under a plurality of conditions for implementation can be obtained and compared with each other. This facilitates assessment or grasp of performance.

Fifth Embodiment

Figure 6:
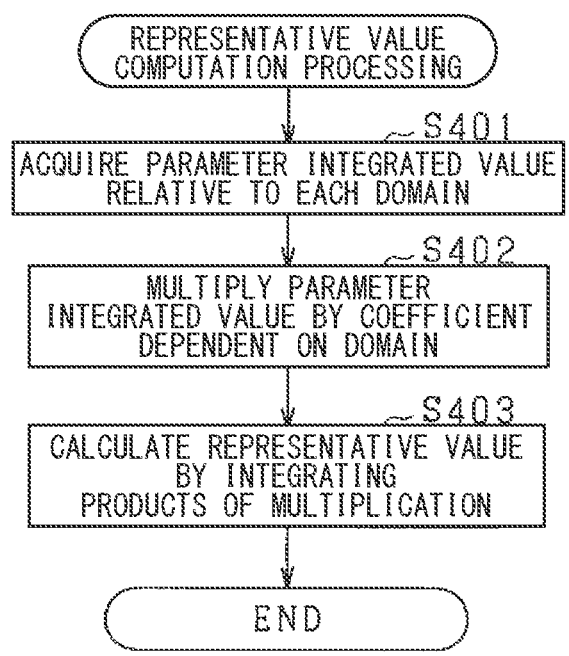
FIG. 6 is a flowchart presenting representative value computation processing of a fifth embodiment.

The vehicle control device is not limited to the above described embodiments, but may be embodied, for example, as described below. The ECU 40 of a fifth embodiment includes, in addition to the same constituent elements as those of the first embodiment, a representative value computation unit that computes a representative value. Referring to FIG. 6, representative value computation processing for computing a representative value will be described below. When inputting an output request for a parameter integrated value from the external device 160, the ECU 40 executes representative value computation processing. The execution timing of the representative value computation processing may be arbitrarily altered. For example, the representative value computation processing may be executed at intervals of a predetermined cycle or when the parameter integrated value is stored.

The ECU 40 acquires a parameter integrated value relative to each of the domains from the memory unit 44 (step S401). The ECU 40 multiplies the acquired parameter integrated value by a coefficient dependent on the domain (step S402). For example, when the engine 10 is in a high load or high output state, an outflow quantity of NOx tends to increase. In order to suppress such an adverse effect, a coefficient by which a parameter integrated value relative to a domain signifying the high load or high output state is multiplied is set to a smaller value, and a coefficient by which a parameter integrated value relative to a domain not signifying the high load or high output state is multiplied is set to a larger value. Thus, the parameter integrated values are weighted.

The ECU 40 computes a representative value by integrating or averaging products of multiplication (step S403), and then terminates representative value computation processing. The ECU 40 outputs the computed representative value to the external device 160.

The representative value computation method may be arbitrarily modified according to an object. For example, a mean value or median may be computed without performing weighting. The other embodiments may include the representative value computation unit.

According to the foregoing embodiment, excellent advantageous effects to be described below are obtained.

As mentioned above, by obtaining a representative value computed by weighting parameter integrated values relative to respective domains, even when the state of the engine 10, vehicle, or catalyst deflects to a predetermined state, comparative investigation can be readily achieved.

Sixth Embodiment

Figure 7:
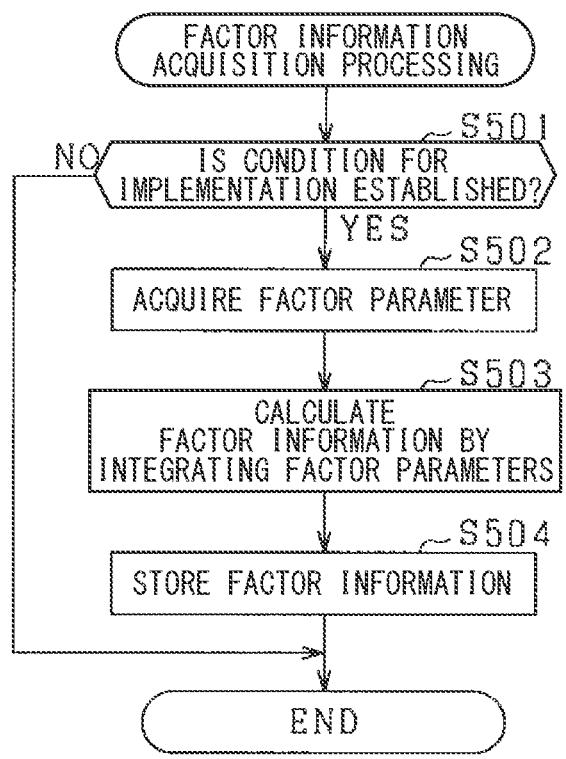
FIG. 7 is a flowchart presenting factor information acquisition processing of a sixth embodiment.

The vehicle control device is not limited to the above described embodiments, but may be embodied, for example, as described below. A sixth embodiment includes a factor acquisition block that acquires a factor parameter representing a factor of NOx outflow to the downstream side of the catalyst, and computes and obtains factor information by integrating acquired factor parameters. Referring to FIG. 7, factor information acquisition processing for storing and holding factor information will be described below. The ECU 40 executes factor information acquisition processing of acquiring factor information concurrently with computation processing. The execution timing of the factor information acquisition processing may be arbitrarily altered. For example, the factor information acquisition processing may be executed at intervals of a predetermined cycle, or may be executed when a parameter integrated value is stored.

The ECU 40 determines whether the above described condition for implementation is established (step S501). When the condition for implementation is not established, computation processing is terminated. On one hand, when the condition for implementation is established, the ECU proceeds to step S502.

The ECU 40 acquires a factor parameter representing a factor of NOx outflow to the downstream side of the catalyst (step S502). As the factor parameter, for example, a quantity (or estimated quantity) of inflow NOx flowing into the catalyst, a quantity of NOx predicted (expected) to pass through the exhaust pipe 15 (quantity expected in a normal state), a parameter correlating to an output of the engine 10, an estimated value of a flow rate of carbon dioxide, an EGR flow rate, and a feed quantity of a reducing agent (urea water or rich spike fuel) to be fed to the catalyst are cited. More particularly, the parameter correlating to an output of the engine 10 includes a product of a combustion torque of the engine 10 by an engine speed, a product of a torque of an engine output shaft by the engine speed, a product of an axle shaft torque by a vehicle speed, an injection quantity of a fuel, an intake quantity of air, and a flow rate of an exhaust gas. When acquiring the factor parameter, the ECU 40 also acquires the above described state parameters. The ECU then proceeds to step S503.

The ECU 40 computes factor information by integrating factor parameters (step S503). At this time, the ECU 40 computes a parameter integrated value in relation to each of a plurality of domains defined according to at least any of the working state of the engine 10, the driven state of the vehicle, and the NOx purification state of the catalyst. The plurality of domains defined at step S503 are identical to those defined at step S103. This facilitates comparative investigation.

The ECU 40 stores in the memory unit 44 computed factor information in association with a parameter integrated value stored at step S104 (step S504). At this time, the parameter integrated value and the factor information are stored in association with each of the domains.

In the sixth embodiment, a quantity of NOx predicted (expected) to pass through the exhaust pipe 15, a parameter correlating to an output, and an estimated value of a flow rate of carbon dioxide is adopted as a value concerning an inflow quantity of NOx. The ECU 40 enables to output factor information, which is stored in the memory unit 44, together with a parameter integrated value to the external device 160 via the communication device 150 in response to a request sent from the external device 160. The other embodiments may include the factor acquisition block. In the sixth embodiment, a factor parameter is acquired in relation to each of domains, and factor information is computed. Alternatively, the factor parameters may not be classified by the domains. The factor information is computed when the condition for implementation is established. Alternatively, the factor information may be computed even when the condition for implementation is not established.

According to the foregoing embodiment, excellent advantageous effects to be described below are obtained.

The ECU 40 stores and holds factor information together with an integrated value of outflow quantities of NOx. This configuration facilitates to comparatively investigate a relationship between an outflow quantity of NOx and factor information which varies along with a change in the working state or the like. In shorts, when the outflow quantity of NOx has varied, a clue to learn the factor can be obtained.

Similarly to computation of a parameter integrated value, the ECU 40 computes factor information by integrating factor parameters in relation to each of domains. The plurality of domains defined at step S503 are identical to those defined at step S103. Therefore, how the factor information and the parameter integrated value vary along with a change of domains, that is, a state change of the engine 10 can be comparatively investigated. This facilitates assessment or grasp of performance.

Outflow quantities of NOx and factor parameters which are acquired on condition that the same condition for implementation is established are integrated to obtain a parameter integrated value and factor information respectively. Therefore, the parameter integrated value and the factor information can be comparatively investigated under the identical circumstances. A clue to investigation of a cause of outflow can be thus readily obtained.

Seventh Embodiment

Figure 8:
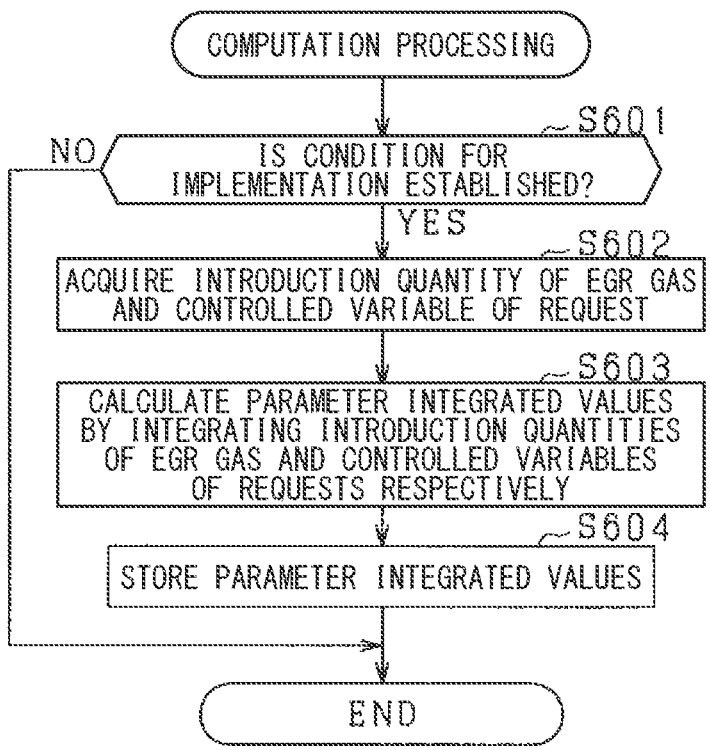
FIG. 8 is a flowchart presenting computation processing of a seventh embodiment.

The vehicle control device is not limited to the above described embodiments, but may be embodied, for example, as described below. In a seventh embodiment, the ECU 40 acquires as an NOx parameter a quantity of an EGR gas or a correlation value correlating to the quantity of the EGR gas, and computes a parameter integrated value by integrating acquired quantities of the EGR gas or correlation values. Referring to FIG. 8, computation processing in the seventh embodiment will be described below.

The ECU 40 determines whether the above described condition for implementation is established (step S601). When the condition for implementation is not established, computation processing is terminated. On one hand, when the condition for implementation is established, the ECU proceeds to step S602.

The ECU 40 acquires as NOx parameters an introduction quantity of an EGR gas and a required controlled variable for the EGR gas (step S602). At step S602, the ECU 40 uses a sensor to detect and acquire the introduction quantity of the EGR gas actually flowing through the EGR pipe 27. The required controlled variable for the EGR gas is a correlation value correlating to the quantity of the EGR gas, and is determined based on the state of the engine 10, vehicle, or catalyst. The aperture of the EGR valve 28 or a valve open time is controlled based on the required controlled variable, and thereby the introduction quantity of the EGR gas is adjusted. At step S602, any other correlation value may be acquired. For example, the any other correlation value is the aperture of the EGR valve 28 or the valve open time.

When executing step S602, the ECU 40 also acquires state parameters in the same manner as the above described one, and then proceeds to step S603.

The ECU 40 computes as parameter integrated values first and second integrated values by integrating acquired introduction quantities of an EGR gas and required controlled variables for the EGR gas respectively (step S603). When executing step S603, the ECU 40 computes the first and second parameter integrated values in relation to each of a plurality of domains defined according to at least any of the working state of the engine 10, the driven state of the vehicle, and the NOx purification state of the catalyst in the same manner as the above described one.

The ECU 40 then stores the computed first and second parameter integrated values in the memory unit 44 (step S604). At this time, the first and second parameter integrated values are stored in association with each of the domains.

The ECU 40 can output the first and second parameter integrated values, which are stored in the memory unit 44, to the external device 160 via the communication device 150 in response to a request sent from the external device 160. In the seventh embodiment, introduction quantities of an EGR gas and their correlation values (required controlled variables for the EGR gas) are acquired and integrated. Alternatively, one of the introduction quantities of the EGR gas and correlation values may be acquired and integrated, and then stored and held.

According to the above described embodiment, excellent advantageous effects to be described below are obtained.

In general, a quantity of NOx discharged from the engine 10 varies depending on an introduction quantity of an EGR gas. Therefore, when a quantity of the EGR gas or a correlation value correlating to the quantity of the EGR gas is adopted as an NOx parameter, purification performance can be grasped. Further, introduction quantities of the EGR gas and required controlled variables for the EGR gas are integrated to acquire first and second parameter integrated values. By comparing the first and second parameter integrated values with each other, whether the EGR system 26 properly operates can be grasped. Further, the introduction quantities of the EGR gas and the correlation values are integrated in relation to each of the domains in order to obtain parameter integrated values. Therefore, how the introduction quantity of the EGR gas and the correlation value vary depending on the domain can be readily comparatively investigated. This is helpful in grasp or assessment of performance.

Eighth Embodiment

The vehicle control device and exhaust purification system are not limited to the above described embodiments, but may be embodied, for example, as described below. In an eighth embodiment, a gasoline engine is substituted for the diesel engine. A three-way catalyst and NOx catalyst are substituted for the SCR catalytic converter 113. A full detail will be given below.

Figure 9:
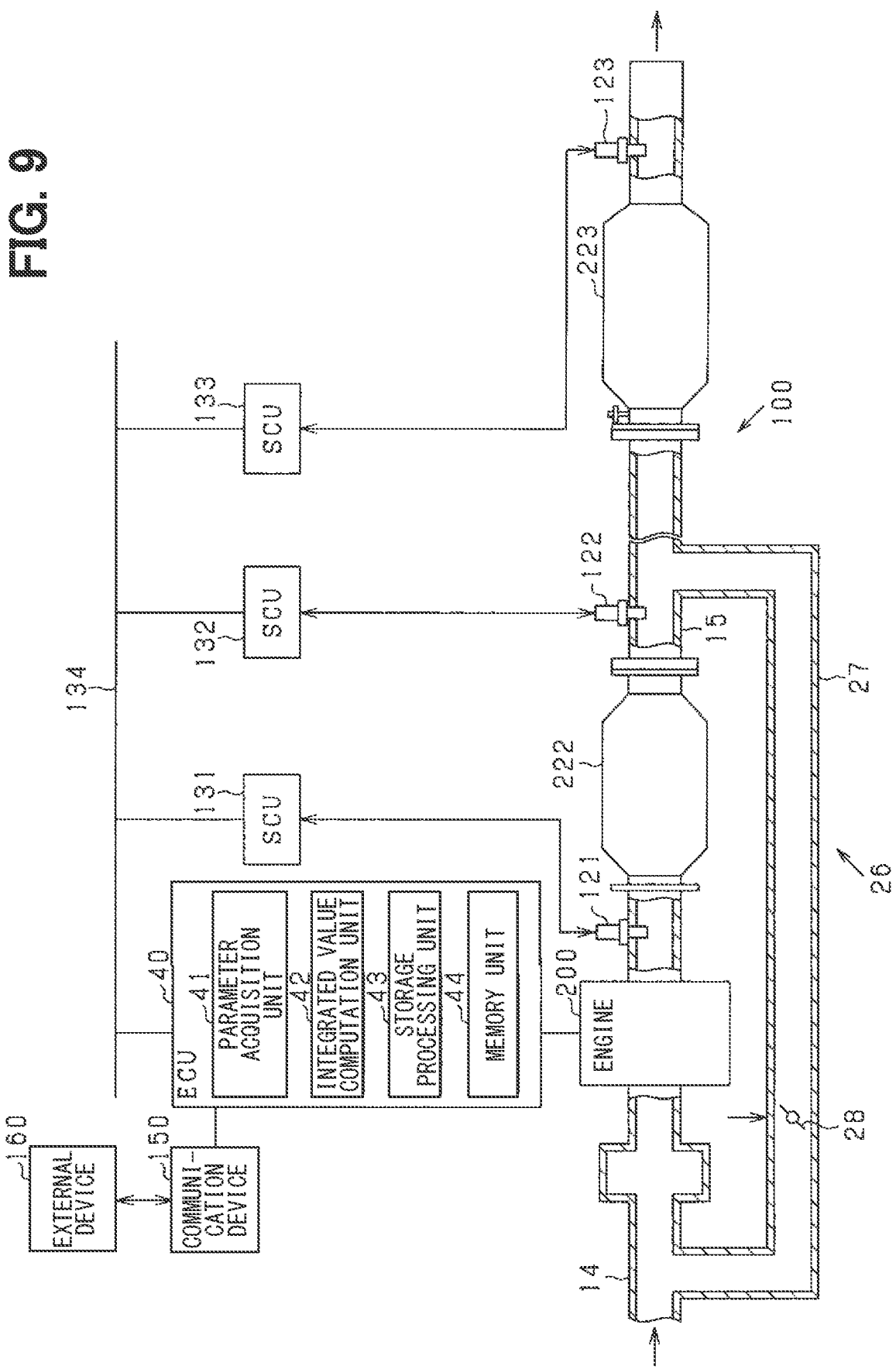
FIG. 9 is a block diagram showing an exhaust purification system of an eighth embodiment.

As shown in FIG. 9, in the eighth embodiment, an onboard multi-cylinder lean-burn engine (hereinafter, an engine 200) that is an internal combustion engine is adopted. In the engine 200, gasoline, alcohol (for example, ethanol or methanol), or a blended fuel of gasoline and alcohol is adopted as a fuel. In the engine 200, a spark ignition method is adopted. The ECU 40 implements control of an injection quantity of a fuel of the engine 200, control of an air-fuel ratio, and control of ignition timing.

In the exhaust pipe 15, a three-way catalyst 222 and an NOx catalyst 223 are placed as catalysts for purifying CO, HC, and NOx in an exhaust gas. The three-way catalyst 222 purifies three components of HC, CO, and NOx of an exhaust with an air-fuel ratio set to near a stoichiometric air-fuel ratio. The NOx catalyst 223 is an NOx occlusion reduction catalyst, occludes NOx in the exhaust during combustion at a lean air-fuel ratio, and reduces (purifies) NOx by reacting the occluded NOx with a rich component (CO, HC, etc.) during combustion at a rich air-fuel ratio.

When a condition for a rich spike is established, the ECU 40 implements a rich spike (injecting a larger quantity of a fuel), and executes reduction control of reducing NOx which is occluded by the NOx catalyst 223. In the eighth embodiment, the fuel is equivalent to a reducing agent. The condition for a rich spike is defined according to at least any of the state of the engine 200, the state of the vehicle, and the deterioration state of the catalyst.

Figure 10:
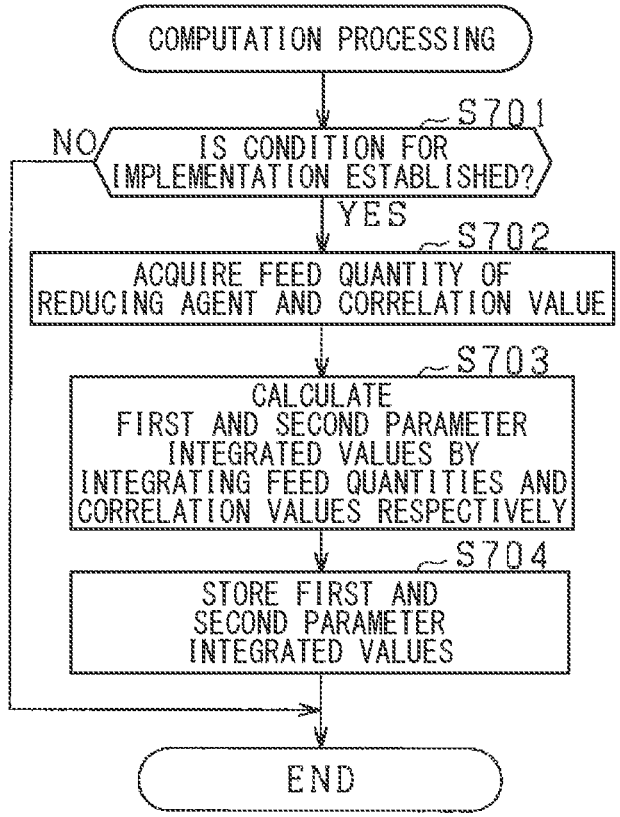
FIG. 10 is a flowchart presenting computation processing of the eighth embodiment.

Next, referring to FIG. 10, computation processing of the eighth embodiment will be described below. The ECU 40 determines whether the above described condition for implementation is established (step S701). When the condition for implementation is not established, computation processing is terminated. On one hand, when the condition for implementation is established, the ECU 40 proceeds to step S702.

The ECU 40 acquires as NOx parameters a feed quantity of a reducing agent and a correlation value correlating to the feed quantity of the reducing agent (step S702). More particularly, the ECU 40 acquires as the feed quantity of the reducing agent, an injection quantity of a fuel (estimated value) actually fed to the catalyst due to a rich spike. The feed quantity of the reducing agent is estimated based on a fuel pressure fall occurring during rich spike injection, a change in an air-fuel ratio, or a lift quantity of a needle valve of a fuel injection valve. An injection valve dedicated to a rich spike may be included and a flow rate at the valve may be measured.

A required controlled variable for a rich spike is acquired as a correlation value correlating to a feed quantity of a reducing agent. The required controlled variable for a rich spike is determined based on the state of the engine 200, vehicle, or catalyst. As the correlation value correlating to the feed quantity of a reducing agent, for example, a quantity of NOx flowing into the NOx catalyst 223, the number of times of injection for a rich spike, or an injection time may be adopted.

When executing step S702, the ECU 40 also acquires state parameters in the same manner as the above described one. The ECU then proceeds to step S703.

The ECU 40 computes as parameter integrated values first and second parameter integrated values by integrating acquired feed quantities of a reducing agent and correlation values, which correlate to the feed quantities of a reducing agent, respectively (step S703). When executing step S703, the ECU 40 computes the first and second parameter integrated values in relation to each of a plurality of domains defined according to at least any of the working state of the engine 200, the driven state of the vehicle, and the NOx purification state of the catalyst in the same manner as the above described one.

The ECU 40 then stores the computed first and second parameter integrated values in the memory unit 44 (step S704). At this time, the first and second parameter integrated values are stored in association with each of the domains.

The ECU 40 can output the first and second parameter integrate values, which are stored in the memory unit 44, to the external device 160 via the communication device 150 in response to a request sent from the external device 160. In the eighth embodiment, feed quantities of a reducing agent and their correlation values (required controlled variables for a rich spike) are integrated. Alternatively, one of the feed quantities of a reducing agent and their correlation values may be integrated, and the results of the integration may be stored and held. Further, a diesel engine may be substituted for the engine 200. A rich spike is implemented by designating a rich air-fuel ratio. Alternatively, a fuel serving as a reducing agent may be directly jetted to the NOx catalyst 223. In this case, an injection quantity may be adopted as a feed quantity, and a quotient of an injection time by the number of times of injection may be adopted as a correlation value correlating to the feed quantity.

According to the foregoing embodiment, excellent advantageous effects to be described below are obtained.

By grasping a situation of feeding a reducing agent (a situation of implementing a rich spike), whether the NOx catalyst 223 is normally functioning or how the NOx catalyst is functioning can be objectively grasped. Therefore, by adopting as an NOx parameter a feed quantity of a reducing agent (a quantity of a reducing agent fed to the catalyst due to a rich spike) or a correlation value correlating to the feed quantity of a reducing agent (required controlled variable for a rich spike), purification performance or a purification state can be objectively grasped.

Feed quantities of a reducing agent and correlation values correlating to the feed quantities of a reducing agent are integrated to acquire first and second parameter integrated values. By comparing the first and second parameter integrated values with each other, whether the NOx catalyst 223 is properly working and how the NOx catalyst 223 is working can be grasped. The feed quantities of a reducing agent and the correlation values correlating to the feed quantities of a reducing agent are integrated in relation to each of the domains. Therefore, how the feed quantity of a reducing agent and the correlation value correlating to the feed quantity of a reducing agent vary depending on the domain or whether the NOx catalyst 223 is normally functioning can be readily comparatively investigated. This is helpful in grasping or assessing performance.

Ninth Embodiment

The vehicle control device is not limited to the above described embodiments, but may be embodied, for example, as described below. In a ninth embodiment, the ECU 40 includes a conversion unit that converts the unit of a parameter integrated value. A full detail will be given below.

Figure 11:
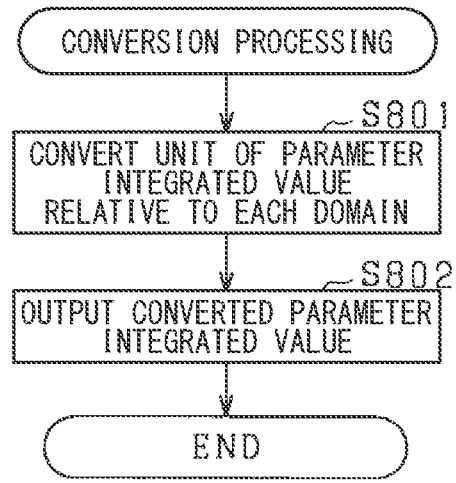
FIG. 11 is a flowchart presenting conversion processing of a ninth embodiment.

When required a parameter integrated value by the external device 160, the ECU 40 executes conversion processing presented in FIG. 11. The ECU 40 converts the unit of a parameter integrated value in relation to each of the domains (step S801). In this processing, for example, a parameter integrated value per workload, a parameter integrated value per mileage, or a parameter integrated value per time is computed.

The ECU 40 outputs a converted parameter integrated value (step S802), and then terminates conversion processing.

In the eighth embodiment, when a parameter integrated value is required by the external device 160, conversion processing is carried out. Alternatively, before the parameter integrated value is stored, the conversion processing may be carried out and the converted value may be stored.

In the eighth embodiment, the ECU 40 includes the conversion unit that converts the unit of a parameter integrated value. A purification rate computation unit that computes a purification rate on the basis of a parameter integrated value may be substituted for the conversion unit. In short, a purification rate may be computed at step S801. Inclusion of the conversion unit or purification rate computation unit facilitates assessment and grasp of performance.

Other Embodiments

The present disclosure is not limited to the above described embodiments, but may be embodied, for example, as described below.

In the above described embodiments, a diesel engine is adopted. A gasoline engine may be substituted for the diesel engine.

In the above described embodiments, as long as NOx can be minimized by introducing an EGR gas, no catalyst may be included.

In the above described embodiments, the EGR system 26 may be excluded. In the above described embodiments, an external EGR is adopted. Alternatively, an internal EGR may be substituted for the external EGR.

In computation processing of the above described embodiments, an NOx parameter may be arbitrarily altered. For example, an addition quantity (injection quantity) of urea water may be adopted as the NOx parameter, and a urea water addition time or the number of times of addition may be adopted as a correlation value correlating to the addition quantity of urea water. Further, the number of trips, the number of times of start of the engine 10 or 200, the number of times or the time by which the purification system (EGR system 26) works, an intake quantity of air, or a flow rate of an exhaust gas may be adopted as the NOx parameter (correlation value correlating to an outflow quantity of NOx). Further, a quantity of NOx discharged to outside the vehicle (passing through a tail pipe) or a quantity of NOx discharged from the engine 10 may be adopted as the NOx parameter.

In the above described embodiments, an outflow quantity of NOx flowing out to the downstream side of the SCR catalytic converter 113 on the basis of an NOx concentration detected by the NOx sensor 123 is acquired as an NOx parameter. As another example, information concerning NOx in an exhaust gas flowing through an exhaust system may be acquired as the NOx parameter. The NOx in an exhaust gas flowing through the exhaust system signifies NOx to be detected at any point in a route from the engine 10 to outside of the vehicle. For example, a quantity of NOx flowing on the upstream side of the EGR system 26 or SCR catalytic converter 113 on the basis of the NOx concentration detected by the NOx sensors 121 and 122 may be acquired as the NOx parameter.

The present disclosure has been described in conformity with examples. The present disclosure is understood not to be limited to the examples or structures. The present disclosure encompasses various variants or modifications falling within a range of equivalents. In addition, various combinations or modes, and other combinations or modes embodied by adding one element, more elements, or less elements to the various combinations or modes shall fall within the scope or compass of thought of the present disclosure.

What is claimed is:

1. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
a parameter acquisition unit configured to acquire a NOx parameter, which is an outflow quantity of NOx flowing out to a downstream of the catalyst when the engine is in operation;
an integrated value computation unit configured to implement integration of the NOx parameter acquired by the parameter acquisition unit to compute a parameter integrated value; and
a storage processing unit configured to store, in the memory unit, the parameter integrated value as the NOx information, wherein
a condition for implementation, under which the integrated value computation unit implements the integration, is defined,
the condition is established when a sensor, which is to detect an introduction amount of EGR gas, does not fail,
the integrated value computation unit includes
a first computation block configured to implement the integration of the NOx parameter, which is acquired by the parameter acquisition unit, to compute a first parameter integrated value when the condition for implementation is established, and
a second computation block configured to implement the integration of the NOx parameter, which is acquired by the parameter acquisition unit, to compute a second parameter integrated value when the condition for implementation is not established, and
the storage processing unit is configured to store, in the memory unit, the first parameter integrated value and the second parameter integrated value as the NOx information.

2. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
a parameter acquisition unit configured to acquire a NOx parameter, which is an outflow quantity of NOx flowing out to a downstream of the catalyst when the engine is in operation;
an integrated value computation unit configured to implement integration of the NOx parameter acquired by the parameter acquisition unit to compute a parameter integrated value; and
a storage processing unit configured to store, in the memory unit, the parameter integrated value as the NOx information, wherein
a condition for implementation, under which the integrated value computation unit implements the integration, is defined,
the condition is established when a purification system does not fail,
the integrated value computation unit includes
a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

3. The vehicle control device according to claim 2, wherein the purification system is an EGR system or the catalyst.

4. The vehicle control device according to claim 3, wherein the catalyst is an oxidation catalytic converter, or a SCR catalytic converter, or a three way catalytic converter, or a NOx catalytic converter.

5. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:

a parameter acquisition unit configured to acquire a NOx parameter, which is an outflow quantity of NOx flowing out to a downstream of the catalyst when the engine is in operation;

an integrated value computation unit configured to implement integration of the NOx parameter acquired by the parameter acquisition unit to compute a parameter integrated value; and a storage processing unit configured to store, in the memory unit, the parameter integrated value as the NOx information, wherein a condition for implementation, under which the integrated value computation unit implements the integration, is defined, the condition is established when a urea water addition valve does not fail, the integrated value computation unit includes a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

6. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:

a parameter acquisition unit configured to acquire a NOx parameter, which is an outflow quantity of NOx flowing out to a downstream of the catalyst when the engine is in operation;

an integrated value computation unit configured to implement integration of the NOx parameter acquired by the parameter acquisition unit to compute a parameter integrated value; and a storage processing unit configured to store, in the memory unit, the parameter integrated value as the NOx information, wherein a condition for implementation, under which the integrated value computation unit implements the integration, is defined, the condition is established when a voltage of a battery is not lower than a predetermined value, the integrated value computation unit includes a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

7. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:

a parameter acquisition unit configured to acquire a NOx parameter, which is an outflow quantity of NOx flowing out to a downstream of the catalyst when the engine is in operation;

an integrated value computation unit configured to implement integration of the NOx parameter acquired by the parameter acquisition unit to compute a parameter integrated value; and a storage processing unit configured to store, in the memory unit, the parameter integrated value as the NOx information, wherein a condition for implementation, under which the integrated value computation unit implements the integration, is defined, the condition is established when a predetermined period of time has passed since the engine is cold-started, the integrated value computation unit includes a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

8. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
- a parameter acquisition unit configured to acquire a NOx parameter, which is an outflow quantity of NOx flowing out to a downstream of the catalyst when the engine is in operation;
- an integrated value computation unit configured to implement integration of the NOx parameter acquired by the parameter acquisition unit to compute a parameter integrated value; and
- a storage processing unit configured to store, in the memory unit, the parameter integrated value as the NOx information, wherein
- a condition for implementation, under which the integrated value computation unit implements the integration, is defined,
- the condition is established when a temperature of the catalyst is higher than a predetermined value,
- the integrated value computation unit includes
  - a first computation block configured to implement the integration of the NOx parameter, which is acquired by the parameter acquisition unit, to compute a first parameter integrated value when the condition for implementation is established, and
  - a second computation block configured to implement the integration of the NOx parameter, which is acquired by the parameter acquisition unit, to compute a second parameter integrated value when the condition for implementation is not established, and
- the storage processing unit is configured to store, in the memory unit, the first parameter integrated value and the second parameter integrated value as the NOx information.

9. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
- a parameter acquisition unit configured to acquire a NOx parameter, which is an EGR flow rate when the engine is in operation;
- an integrated value computation unit configured to implement integration of the NOx parameter acquired by the parameter acquisition unit to compute a parameter integrated value; and
- a storage processing unit configured to store, in the memory unit, the parameter integrated value as the NOx information, wherein
- a condition for implementation, under which the integrated value computation unit implements the integration, is defined,
- the condition is established when a sensor, which is to detect an introduction amount of EGR gas, does not fail,
- the integrated value computation unit includes
  - a first computation block configured to implement the integration of the NOx parameter, which is acquired by the parameter acquisition unit, to compute a first parameter integrated value when the condition for implementation is established, and
  - a second computation block configured to implement the integration of the NOx parameter, which is acquired by the parameter acquisition unit, to compute a second parameter integrated value when the condition for implementation is not established, and
- the storage processing unit is configured to store, in the memory unit, the first parameter integrated value and the second parameter integrated value as the NOx information.

10. The vehicle control device according to claim 9, wherein
the condition is established when an EGR system does not fail.

11. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
- a parameter acquisition unit configured to acquire a NOx parameter, which is an EGR flow rate when the engine is in operation;
- an integrated value computation unit configured to implement integration of the NOx parameter acquired by the parameter acquisition unit to compute a parameter integrated value; and
- a storage processing unit configured to store, in the memory unit, the parameter integrated value as the NOx information, wherein
- a condition for implementation, under which the integrated value computation unit implements the integration, is defined,
- the condition is established when a voltage of a battery is not lower than a predetermined value,
- the integrated value computation unit includes
  - a first computation block configured to implement the integration of the NOx parameter, which is acquired by the parameter acquisition unit, to compute a first parameter integrated value when the condition for implementation is established, and
  - a second computation block configured to implement the integration of the NOx parameter, which is acquired by the parameter acquisition unit, to compute a second parameter integrated value when the condition for implementation is not established, and
- the storage processing unit is configured to store, in the memory unit, the first parameter integrated value and the second parameter integrated value as the NOx information.

12. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:
- a parameter acquisition unit configured to acquire a NOx parameter, which is an EGR flow rate when the engine is in operation;
- an integrated value computation unit configured to implement integration of the NOx parameter acquired by the parameter acquisition unit to compute a parameter integrated value; and
- a storage processing unit configured to store, in the memory unit, the parameter integrated value as the NOx information, wherein
- a condition for implementation, under which the integrated value computation unit implements the integration, is defined,
- the condition is established a predetermined period of time has passed since the engine is cold-started,
- the integrated value computation unit includes a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

13. The vehicle control device according to claim 12, wherein the exhaust system includes an EGR system.

14. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:

a parameter acquisition unit configured to acquire a NOx parameter, which is an EGR flow rate when the engine is in operation;

an integrated value computation unit configured to implement integration of the NOx parameter acquired by the parameter acquisition unit to compute a parameter integrated value; and a storage processing unit configured to store, in the memory unit, the parameter integrated value as the NOx information, wherein a condition for implementation, under which the integrated value computation unit implements the integration, is defined, the condition is established when a temperature of the catalyst is higher than a predetermined value, the integrated value computation unit includes a first computation block configured to implement the integration of the NOx parameter, which is acquired by the parameter acquisition unit, to compute a first parameter integrated value when the condition for implementation is established, and a second computation block configured to implement the integration of the NOx parameter, which is acquired by the parameter acquisition unit, to compute a second parameter integrated value when the condition for implementation is not established, and the storage processing unit is configured to store, in the memory unit, the first parameter integrated value and the second parameter integrated value as the NOx information.

15. A vehicle control device configured to store and hold, in a memory unit, NOx information which is information concerning NOx in exhaust gas flowing through an exhaust system of an onboard engine of a vehicle or concerning NOx purification by a catalyst placed in the exhaust system, the vehicle control device comprising:

a parameter acquisition unit configured to acquire a NOx parameter, which is an EGR flow rate when the engine is in operation;

an integrated value computation unit configured to implement integration of the NOx parameter acquired by the parameter acquisition unit to compute a parameter integrated value;

a storage processing unit configured to store, in the memory unit, the parameter integrated value as the NOx information;

a factor acquisition block configured to acquire a factor parameter, which is an output of the engine, and integrate the factor parameter to compute factor information, wherein the storage processing unit is configured to store, in the memory unit, an integrated value of an outflow quantity of NOx together with the factor information.

* * * * *